(12) United States Patent
Akagi et al.

(10) Patent No.: US 6,633,483 B2
(45) Date of Patent: Oct. 14, 2003

(54) PORTABLE INFORMATION TERMINAL APPARATUS

(75) Inventors: Toshimasa Akagi, Hachioji (JP); Akifumi Kabeya, Sagamihara (JP); Tatsuyuki Uemura, Tachikawa (JP); Takashi Suzuki, Chofu (JP); Hideki Okuyama, Sagamihara (JP)

(73) Assignee: Olympus Optical Co., Ltd., Tokyo (JP)

( * ) Notice: Subject to any disclaimer, the term of this patent is extended or adjusted under 35 U.S.C. 154(b) by 3 days.

(21) Appl. No.: 09/995,311

(22) Filed: Nov. 27, 2001

(65) Prior Publication Data

US 2002/0064023 A1 May 30, 2002

(30) Foreign Application Priority Data

Nov. 28, 2000 (JP) ......................................... 2000-361587

(51) Int. Cl.[7] .............................. H05K 5/00; H05K 7/00
(52) U.S. Cl. .......................................... 361/686; 439/86
(58) Field of Search ............................ 429/89–100, 86; 361/686, 727, 728, 741, 747, 752, 753, 759, 796, 797, 814

(56) References Cited

U.S. PATENT DOCUMENTS

| 5,854,737 | A | * | 12/1998 | Obata et al. | 361/686 |
| 5,923,537 | A | * | 7/1999 | Kuo et al. | 361/755 |
| 6,141,505 | A | * | 10/2000 | Miyata et al. | 396/535 |
| 6,222,726 | B1 | * | 4/2001 | Cha | 361/683 |

FOREIGN PATENT DOCUMENTS

JP            11-17792 A        1/1999

* cited by examiner

Primary Examiner—Darren Schuberg
Assistant Examiner—Anthony Q. Edwards
(74) Attorney, Agent, or Firm—Frishauf, Holtz, Goodman & Chick, P.C.

(57) ABSTRACT

The present invention relates to a portable information terminal apparatus including a stopper mechanism for operating in such a manner that, in a state in which a detachable built-in electronic device such as a memory card is inserted and attached to a connector arranged in the apparatus, when an external impact is applied, the memory card is prevented from being detached from the connector on the rear side of the memory card or, even when the card is detached, the detachment is restricted within a detachment allowable range where electrical connection is not influenced.

8 Claims, 10 Drawing Sheets

PORTABLE INFORMATION TERMINAL APPARATUS

CROSS-REFERENCE TO RELATED APPLICATIONS

This application is based upon and claims the benefit of priority from the prior Japanese Patent Application No. 2000-361587, filed Nov. 28, 2000, the entire contents of which are incorporated herein by reference.

BACKGROUND OF THE INVENTION

1. Field of the Invention

The present invention relates to a portable information terminal apparatus in which an electronic device is carried. Particularly, the present invention relates to an improvement in prevention of detachment of a built-in electronic device due to an external impact when the detachable built-in electronic device is attached to the apparatus.

2. Description of the Related Art

Generally, as a portable information terminal apparatus having an electronic device therein, various apparatuses such as a radio communication device such as a cellular phone, a personal computer, a remote-control unit, and a handy-type barcode reader have been known.

Since the portable information terminal apparatus is manufactured with emphasis on reduction in size and weight, basic functions and basic performance capabilities are narrowed to reduce parts to be carried to some extent. Accordingly, the apparatus has a connector constitution in which a built-in electronic device can be added or replaced detachably. Various built-in electronic devices having an optional function is attached as necessary.

As a built-in electronic device, for example, there is a card-shaped storage medium (hereinbelow, referred to as a memory card) in which a flash memory for storing data is carried. Generally, there is a limit in the storage capacity of a main memory in a main body of the apparatus. Accordingly, basic software and main application software are stored in the main memory and data is stored in the detachable memory card.

As to attachment, in many cases, the abovementioned built-in electronic device such as a memory card is inserted into a slot and is then fitted to a connector. To realize easy attachment or detachment of the device by the user, the device is merely inserted, whereby the attachment is completed without fixing with a screw.

Ordinarily, the user carries the portable information terminal apparatus. Accordingly, due to carelessness, an external impact is applied to the apparatus in many cases (for example, the impact is generated because the user bumps or falls the apparatus).

In consideration of the fact, the apparatus main body has a constitution or cover to absorb the impact to avoid damage. In the built-in electronic device as well, when receiving the impact, the device may be detached from the connector. When the connector detachment occurs, data cannot be transmitted or received. As to data which is not recorded yet, a power source must be turned off to again attach the memory card in some cases. At that time, the unrecorded data may be lost. When the apparatus is operated in a state in which the memory card is partly detached, the memory card itself may be damaged.

As a measure against the connector detachment, various means have been considered.

Most of the portable information terminal apparatuses have a constitution in which the memory card is inserted through the slot opened outside and is then fitted to the connector. In the constitution, the memory card is attached while one part thereof is being exposed to the outside and a nail portion for lock, which is provided on the side surface of the apparatus, is engaged with a recess or the like on the side surface of the memory card to prevent the detachment. In the state in which one part of the memory card is exposed, the memory card can be detached easily but the memory card is influenced by an environmental problem (water or dust easily enters the memory card).

A constitution in which the memory card is disposed in the apparatus to reduce the influence due to the environment has been examined. For example, according to Jpn. Pat. Appln. KOKAI Publication No. 11-17792, in a portable receiving apparatus as an example, there is proposed a technique in that a battery cover prevents an ROM socket, to which an ROM is attached and which can be hinged, from being raised to avoid the movement of a memory chip. An electrode of the ROM is provided on the main surface side and is come into contact with an ROM contact with pressure to realize electrical connection. Accordingly, out-of-contact due to the movement in the horizontal direction with respect to the contact plane has a large allowance range. In an example in which a memory chip is fitted into the receiving apparatus according to another embodiment, the memory chip may be come off as much as a clearance between the memory chip and the battery cover.

As mentioned above, in the connection to the connector through a terminal, the attached built-in electronic device is fixed surely to avoid connector detachment and, even when the device is detached, the device is restricted within a range where the operation is not influenced completely, or else the abovementioned problems occur.

BRIEF SUMMARY OF THE INVENTION

It is an object of the present invention to provide a portable information terminal apparatus in which a stopper mechanism with a simple constitution is provided, so that even when an external impact is applied, an attached built-in electronic device that is detachable can be prevented from being detached over an allowance range. It is another object of the present invention to provide a portable information terminal apparatus with a simple constitution, in which impact-resistant properties and water-resistant properties for a detachable built-in electronic device can be improved.

To accomplish the above objects, according to the present invention, there is provided a portable information terminal apparatus including: an information input portion; a circuit board having a CPU for processing inputted information; a display portion for displaying information; a detachable card-shaped electronic device; an internal battery for supplying an electric power driving the components; a battery receiving portion for receiving the internal battery; a detachable battery cover for covering the battery receiving portion; a connector including a connecting terminal for transmitting or receiving a signal to/from the card-shaped electronic device, in which the card-shaped electronic device is inserted to be held; and a stopper mechanism for preventing the card-shaped electronic device from being detached from the connector.

The stopper mechanism may be integrally provided for the connector and may include a restricting member for restricting the movement of the card-shaped electronic device in the detaching direction (opposite to the attaching direction).

The restricting member may include: an elastic member constituted so as to be changeable between a first state in which the card-shaped electronic device can be attached or detached to/from the connector and a second state in which the card-shaped electronic device is restricted from being detached from the connector; and a holding member for holding the elastic member in the second state.

The battery receiving portion may include: an opening through which the card-shaped electronic device is attached or detached to/from the connector arranged in a main body of the apparatus; and a connector door member for covering the opening for the connector, and the connector door member has a projecting portion for pressing the elastic member to hold the member in the second state.

Further, the battery receiving portion may include: an opening through which the card-shaped electronic device is attached or detached to/from the connector arranged in a main body of the apparatus; and a connector door member for covering the opening for the connector, in which the stopper mechanism is arranged. The stopper mechanism, which is arranged in the connector door member, may include a connector door board, a key member, a fixing hook portion, and a wedge-shaped stopper member, and the key member is slid, the wedge-shaped stopper member is come into contact with the card-shaped electronic device so as to push the card-shaped electronic device, and after that, the key member is engaged with the fixing hook portion, thereby preventing the card-shaped electronic device from being detached from the connector. The holding member may be a projecting portion formed on the rear surface of the battery cover.

Furthermore, to accomplish the above objects of the present invention, there is provided a portable information terminal apparatus including: an information input portion; a circuit board having a CPU for processing inputted information; a display portion for displaying information; a detachable card-shaped electronic device; an internal battery for supplying an electric power driving the components; a battery receiving portion for receiving the internal battery; and a detachable battery cover for covering the battery receiving portion, wherein the battery receiving portion includes: an opening through which the card-shaped electronic device is attached or detached to/from a connector disposed in a main body of the apparatus; and a connector door member for covering the opening for the connector, and only when the battery cover and the connector door member are detached, the card-shaped electronic device can be detached.

In the above-mentioned constitutions, the detachable card-shaped electronic device may be a card-shaped storage medium (memory card) having any one of recording means such as a semiconductor memory device, a CD-R, a DVD-RAM, an MO (magneto-optical disk), and a hard disk.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will now be described in detail hereinbelow with reference to the drawings.

Figure 2A:
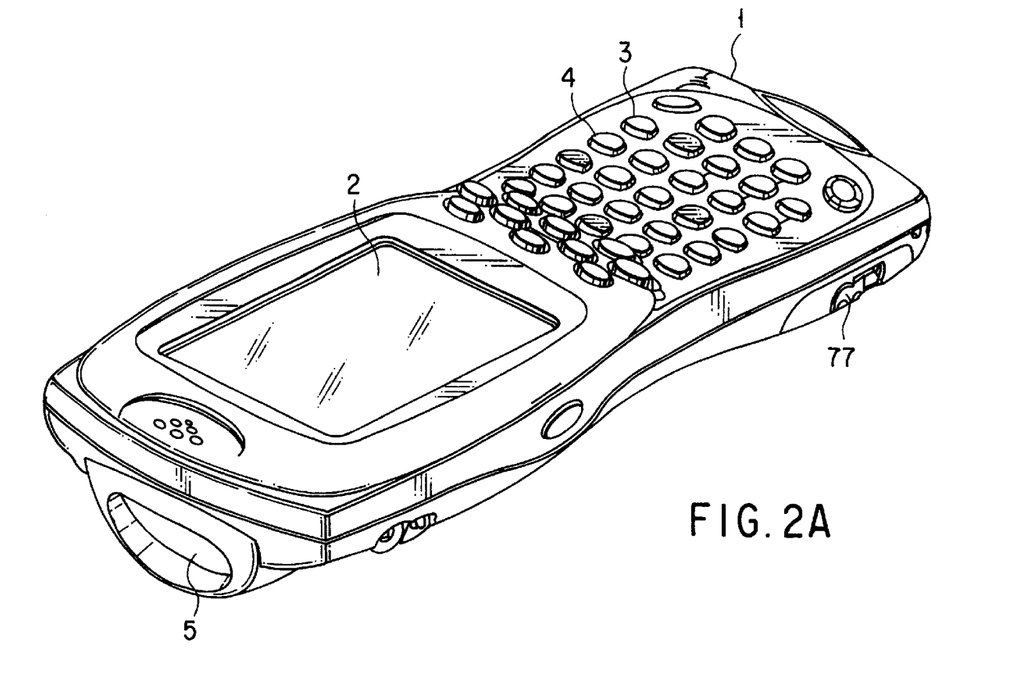
FIGS. 2A and 2B are external views showing the configuration of a processing apparatus having a barcode reading function to which the first embodiment is applied.
Figure 2B:
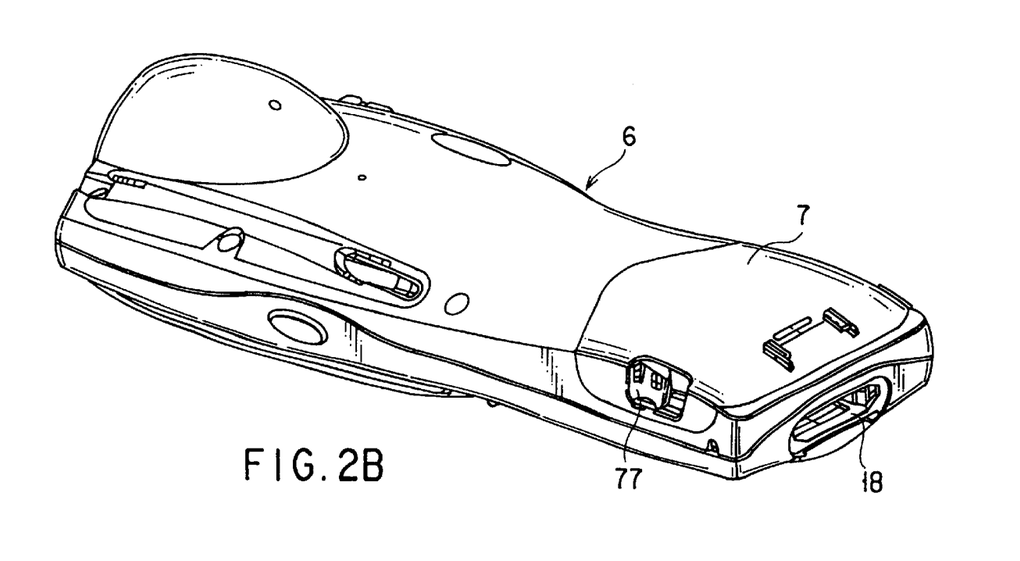

FIGS. 2A and 2B are external views of a processing apparatus with a barcode reading function as a first embodiment of a portable information terminal apparatus according to the present invention. FIG. 2A is a front view of the processing apparatus and FIG. 2B is a backside view thereof.

In the processing apparatus 1, a display portion 2 for displaying a character, a number, and other information; and an input portion 4 in which a plurality of keys 3 are arranged are provided on the front side. On the upper side, a beam window 5 for irradiating beam light for reading and receiving reflected light to read data is provided. On the rear side, a battery compartment cover 7 is fitted to a main body rear cover 6. The battery compartment cover 7 includes a lock mechanism 77 so that the cover is not detached accidentally. A connector portion 18 to be connected to an external device is provided on the bottom of the processing apparatus 1.

Figure 1A:
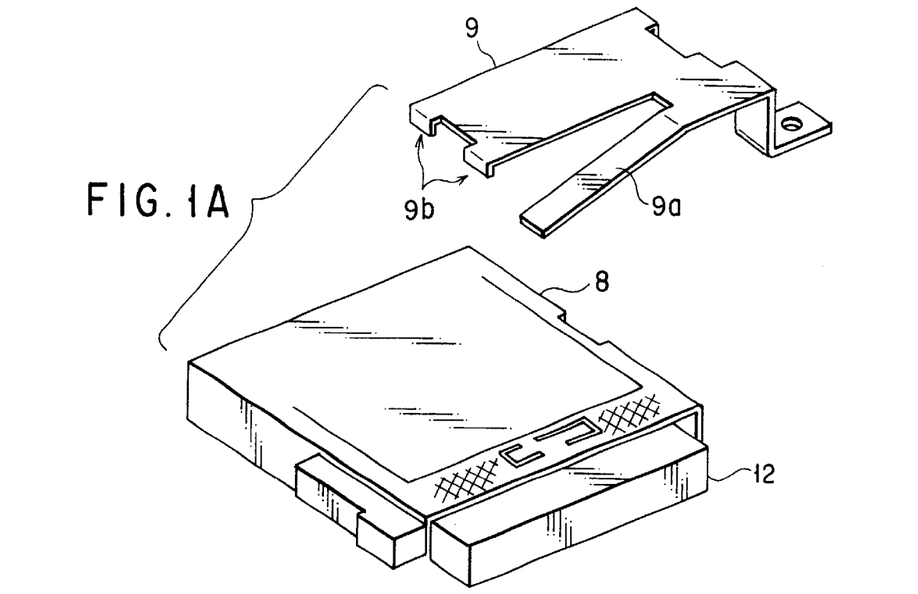
FIGS. 1A and 1B are diagrams showing a constitutional example of a stopper mechanism for preventing connector detachment according to a first embodiment.
Figure 1B:
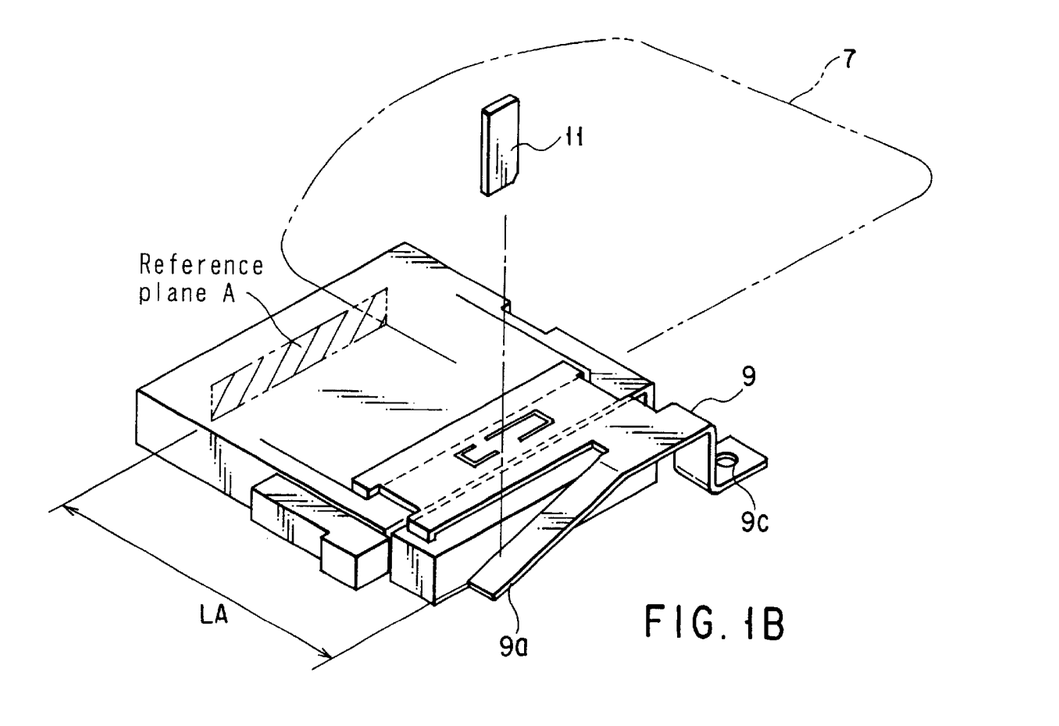

FIGS. 1A and 1B explain a stopper mechanism to prevent connector detachment in, for example, a memory card as a detachable built-in electronic device according to the first embodiment.

The stopper mechanism is constituted in such a manner that a stopper member 9 made of metal such as stainless steel is integrally attached to a connector main body 8 to which a memory card 12 is attached. The stopper member 9 includes a plate spring portion 9a which is cantilever-shaped and can be bent (warped). The stopper member 9 further includes two fixing portions 9b to be fitted and fixed to the connector main body 8 and a screw hole 9c to be fixed to a board of the apparatus.

FIG. 1B shows a state in which the stopper member 9 is attached to the connector main body 8. When the battery compartment cover 7 is closed, a projecting portion 11 provided on the rear surface of the battery compartment cover 7 presses the plate spring portion 9a and the plate spring portion 9a is moved downward on the rear surface side of the memory card 12 inserted in a slot of the connector main body 8 to prevent the memory card 12 from being detached.

The stopper member 9 is formed in such a manner that a steel plate of stainless steel is stamped and is then bent. The material is not limited to the steel plate. Any material in which the accuracy of each dimension in manufacturing is maintained and which resists deformation or bending caused by heat can be used. When conditions are satisfied, the stopper member can be made of resin.

Positional relation between the connector main body 8 and the stopper member 9 upon attachment will now be described. To specifically explain, "CompactFlash (registered trademark)" carrying a flash memory is used as an example of the memory card and the explanation will be made according to the specifications thereof.

According to the present embodiment, when a CompactFlash is attached, the plate spring portion 9a is moved down on the rear surface side (opposite to the side on which a connector terminal is arranged) of the CompactFlash to prevent the CompactFlash from being detached from a connector. It is important to set a distance LA from a position of the connector (reference plane A) to a position to which the plate spring portion 9a is moved down. In other words, when the connector terminal of the CompactFlash begins to be detached from a connector pin, a range where the connector terminal is electrically connected to the connector pin and the operation is not influenced completely is set as a "detachment allowable range". On the basis of the detachment allowable range, the distance LA has to be set.

Figure 3A:
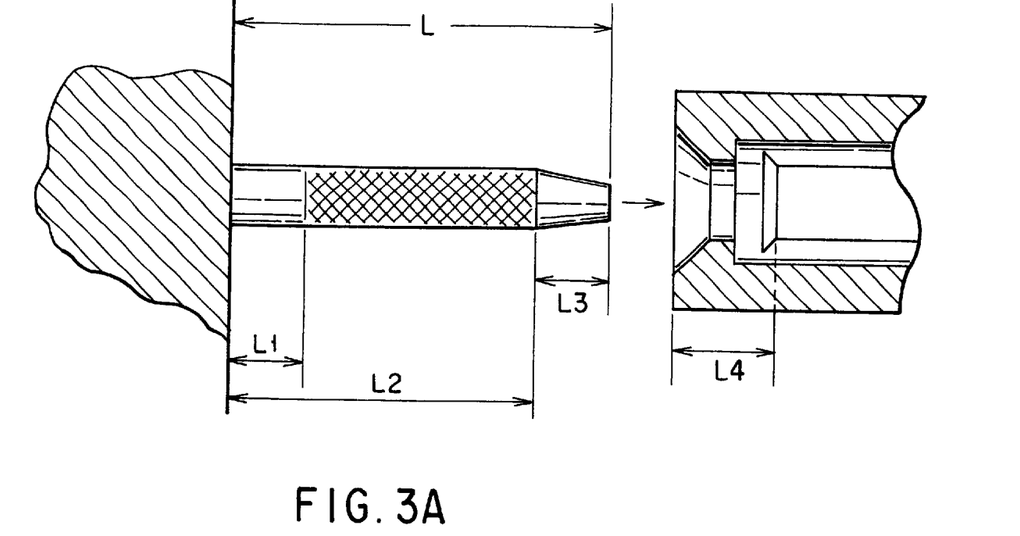
FIGS. 3A and 3B are diagrams explaining a detachment allowable range of the connector detachment.

To set the detachment allowable range of the CompactFlash, detecting pins disposed on both sides of the connector are used. According to the specifications of the well-known CompactFlash, the length (case length) on the side where the connector is arranged is set to 36.4±0.15 mm. As shown in FIG. 3A, the length L of the detecting pin is defined to 3.5±0.1 mm, a portion L2 where actual electrical connection is made is defined to 3.0±0.1 mm, and a guide portion L3 at the end of the pin is defined to 0.5±0.1 mm. A detecting-pin connector terminal of the CompactFlash is located backward from other pin connector terminals as observed from a contact plane (reference plane A). A distance L4 is defined to 0.5 to 2.5 mm (in this case, 1.5±1.0 mm).

Figure 3B:
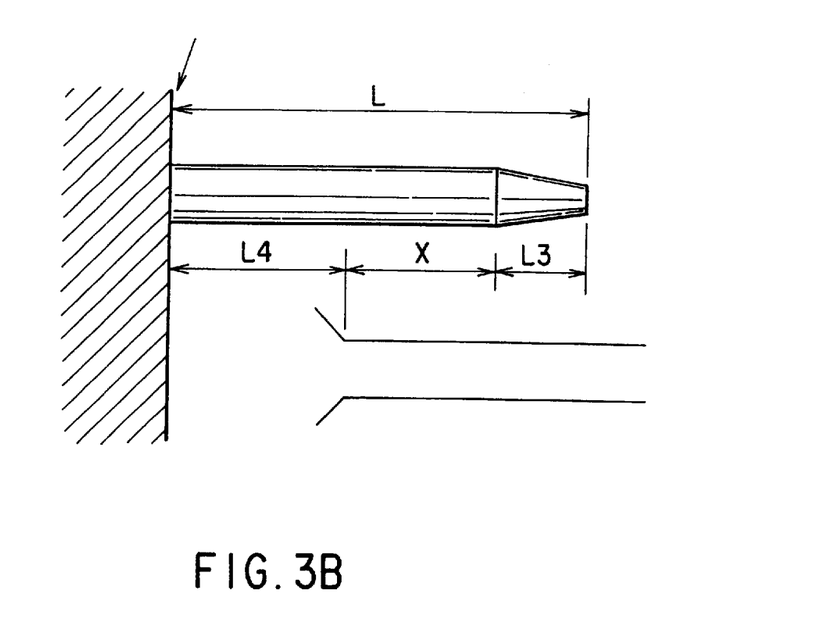

Accordingly, as shown in FIG. 3B, when the CompactFlash is actually inserted, a distance X where the detecting pin is come into contact with the connector terminal is obtained as follows:

$$X = L - L3 - L4$$

When this expression is simply accumulated in accordance with the above-mentioned specifications, X=1.5±1.2 mm, namely, $0.3 \leq X \leq 2.7$ mm.

In other words, when the detecting pin comes off by 0.3 mm at the minimum, such a state is recognized as connector detachment. As mentioned above, however, the length of CompactFlash is set to 36.25 mm at the minimum to 36.55 mm at the maximum. A difference therebetween is 0.3 mm. Accordingly, in a case where the distance LA is set to a CompactFlash having a length of 36.55 mm, even when a CompactFlash having a length of 36.25 mm is attached to be normally inserted up to the contact plane, a gap of 0.3 mm exists between the CompactFlash and the plate spring portion 9a. When the CompactFlash is detached to come into contact with the plate spring portion 9a, it is determined that the detecting pin comes out.

However, the case is obtained on the assumption of the simple accumulation. When a person skilled in the art uses the well-known square-root law accumulation, X=1.5±1.01 mm, namely, $0.49 \leq X \leq 2.51$ mm. Accordingly, when the detecting pin comes out by 0.49 mm, detachment is determined. In the square-root law accumulation, the following expression is used:

$$D = M \pm \sqrt{(\Sigma(Xi - Xbar)^2)}$$

where, D: accumulation dimension,
M: accumulation population mean,
Xi: upper limit of each dimension, and
Xbar: median of each dimension.

Figure 4:
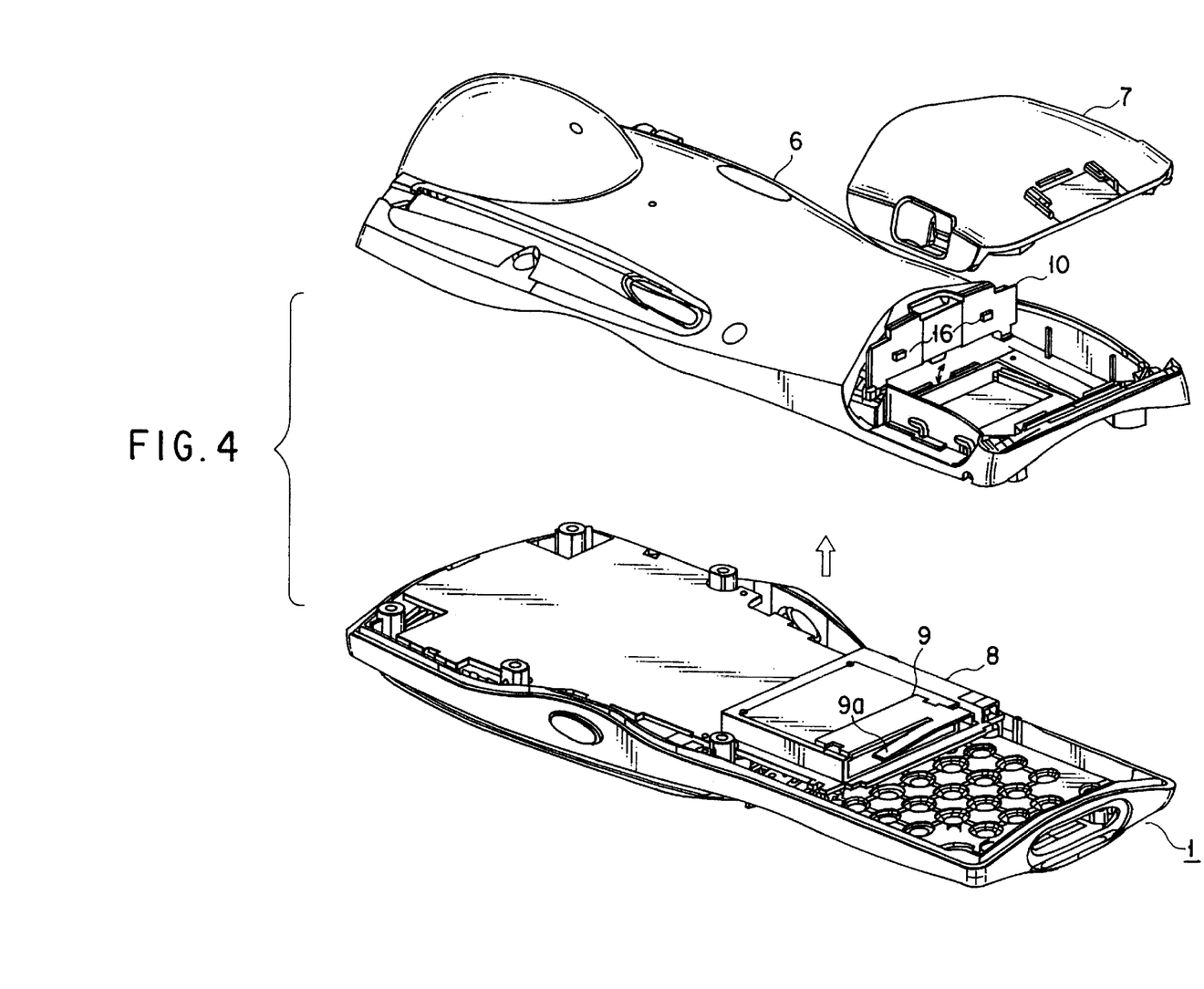
FIG. 4 is a view explaining the processing apparatus in which the stopper mechanism is carried to prevent the connector detachment in the first embodiment.
Figure 5:
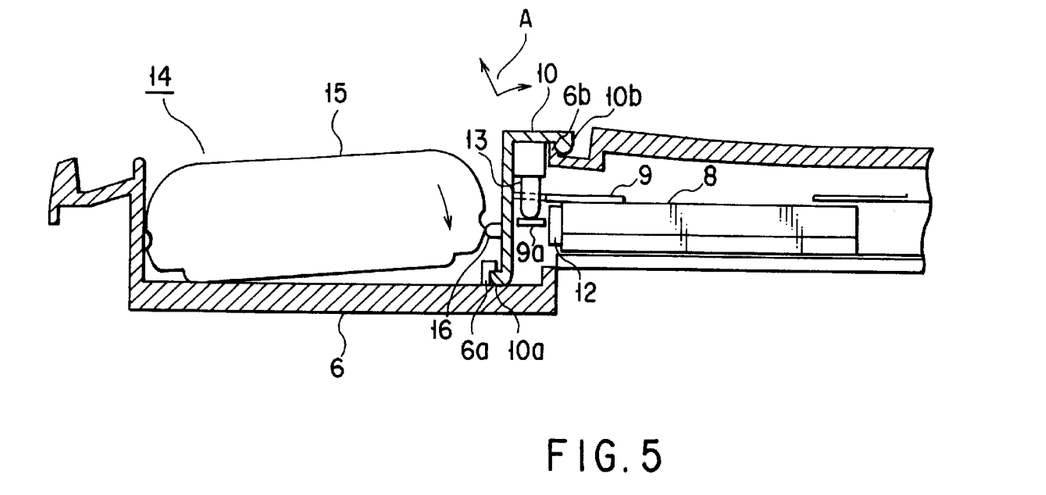
FIG. 5 is a diagram showing a portional view of the constitution of the stopper mechanism carried in the processing apparatus shown in FIG. 4.

FIG. 4 shows an example of the constitution in which the stopper mechanism according to the foregoing first embodiment is carried in the processing apparatus 1. FIG. 5 shows a portional view of the constitution.

In the example, in the processing apparatus 1, the connector main body 8 to which the stopper member 9 is attached is arranged on the inside as observed from a battery compartment 14. An insertion slot (opening) of the connector main body 8, through which the memory card 12 is inserted, is opened in the battery compartment 14. The opening is closed by attaching a connector door 10. The connector door 10 is L-shaped. On the lower side of the connector door 10, a nail portion 10a to be engaged with a lower hook 6a formed in the apparatus main body is formed. On the upper side, a nail portion 10b to be engaged with an upper hook 6b formed in the apparatus main body is formed. On the rear surface of the connector door 10, there is provided a projecting portion 13 to push the abovementioned plate spring portion 9a in the state in which the connector door 10 is attached to the apparatus main body to bend the plate spring portion 9a to a position at which the plate spring portion 9a prevents the memory card 12 from being detached.

When the stopper member 9 is attached to the connector main body 8, the distance where the plate spring portion 9a is pushed from the connector plane (reference plane A) in the connector main body 8 is adjusted in accordance with an error between the external dimensions of the memory cards in manufacturing. For example, the stopper member 9 is attached so as to match the maximum external dimension (including the manufacturing error) of the memory card.

Furthermore, when the connector door 10 is attached to the apparatus main body, the connector door 10 forms one side wall of the battery compartment 14 and includes a projecting portion 16 functioning as a stopper for a battery 15.

According to the present embodiment, in the abovementioned constitution, due to the stopper mechanism having the cantilever-shaped plate spring, when the memory card 12 is inserted into the slot and the connector door 10 is then fitted, the projecting portion 13 formed on the rear side of the connector door 10 pushes and bends the plate spring portion 9a to move the spring portion down on the rear side of the memory card 12. As mentioned above, since the stopper member 9 is integrally attached to the connector main body 8 into which the memory card 12 is inserted, even when an impact is applied to the memory card 12 fitted to the connector, the detaching distance can be restricted within a range where the electrical connection is maintained, so that the connector detachment can be prevented.

The memory card 12 is inserted in the apparatus main body through the slot in the battery compartment. Accordingly, as compared with a conventional type apparatus in which a memory card is exposed to the outside, the operation of the lock mechanism 77 in the battery compartment is added to improve a water-resistant function and, further, avoid a direct impact against the memory card.

Figure 6A:
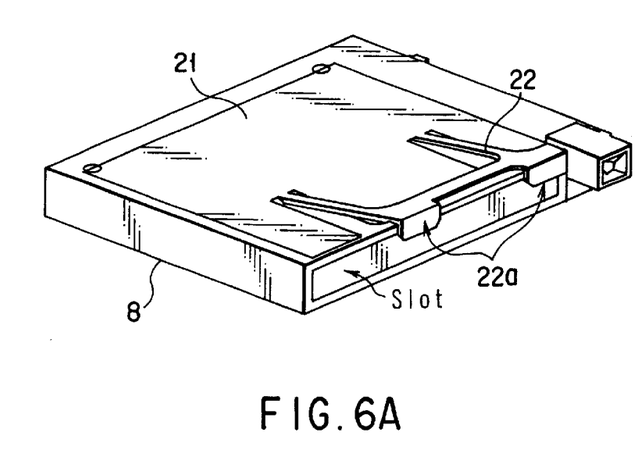
FIGS. 6A and 6B are diagrams showing a constitutional example of a stopper mechanism to prevent connector detachment according to a second embodiment.
Figure 6B:
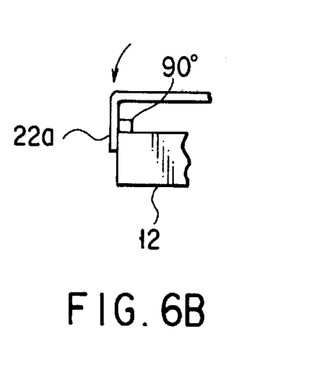
Figure 7A:
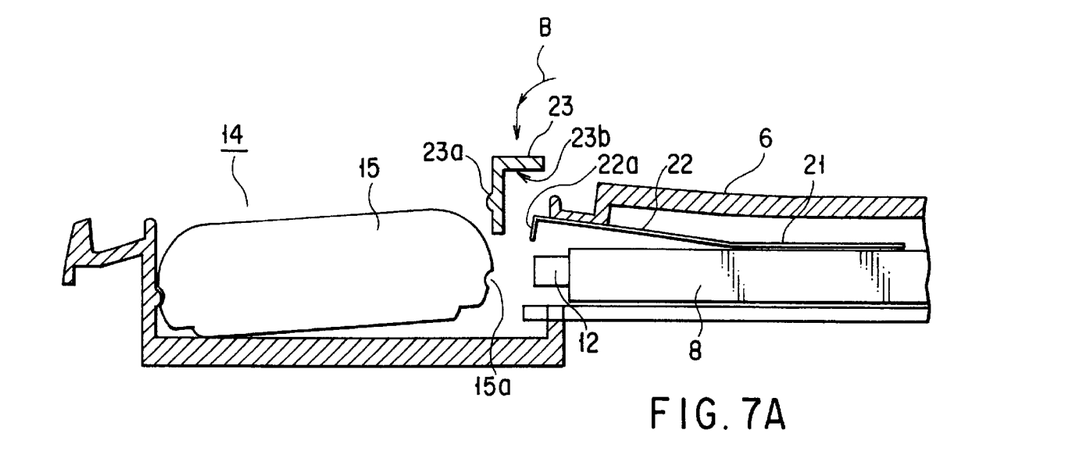
FIGS. 7A and 7B are portional views explaining the constitution according to the second embodiment, in which the stopper mechanism is carried in the processing apparatus to prevent the connector detachment.
Figure 7B:
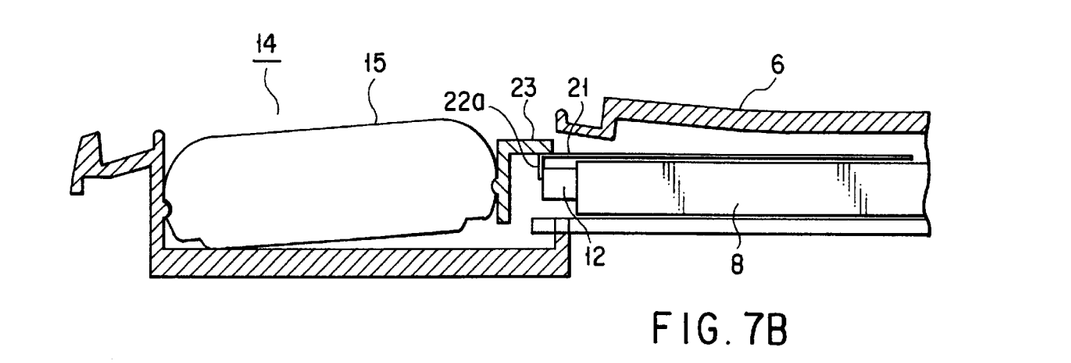

FIGS. 6A and 6B show and describe a constitutional example of a stopper mechanism, which prevents connector detachment, according to a second embodiment regarding the portable information terminal apparatus of the present invention. FIGS. 7A and 7B show portional views in a case where the stopper mechanism is carried in the processing apparatus.

A stopper member 21 made of metal such as stainless steel is attached to the connector main body 8 to constitute the stopper mechanism. In the stopper member 21, a U-shaped lock plate spring portion 22 is formed and two nail portions 22a are formed on both sides. As shown in FIG. 6B, the nail portions 22a are bent so as to be engaged in parallel with the rear surface of the memory card when the nail portions 22a are set to detachment-preventing positions. In this case, the nail portions 22a are bent at 90° with respect to the principal plane of the memory card.

FIG. 7A shows the state in which the connector main body 8 having the stopper mechanism is attached to the processing apparatus according to the above-mentioned first embodiment. FIG. 7B shows the state in which a connector door 23 is inserted to prevent the memory card from being detached.

In the processing apparatus as well, the connector main body 8 is disposed on the inside as observed from the battery compartment 14. A slot through which the memory card 12 is inserted is opened in the battery compartment 14. The L-shaped connector door 23 is fitted to close such an opening.

First, the memory card 12 is inserted through the slot and is then fitted to a connector (not shown). Subsequently, the battery 15 is put into the battery compartment 14 and, after that, the lower edge of the connector door 23 is inserted between the battery 15 and the nail portions 22a obliquely (in a direction shown by an arrow B). The connector door 23 is slipped therebetween so that a projecting portion 23a functioning as a battery stopper is fitted to a groove 15a of the battery 15 and is then inserted straight, whereby the attachment of the connector door 23 is completed. At that time, as shown in FIG. 7B, a plane 23b of the connector door 23 pushes the nail portions 22a to fit the nail portions to the rear surface of the memory card 12, thereby preventing the memory card 12 from being detached.

Figure 8:
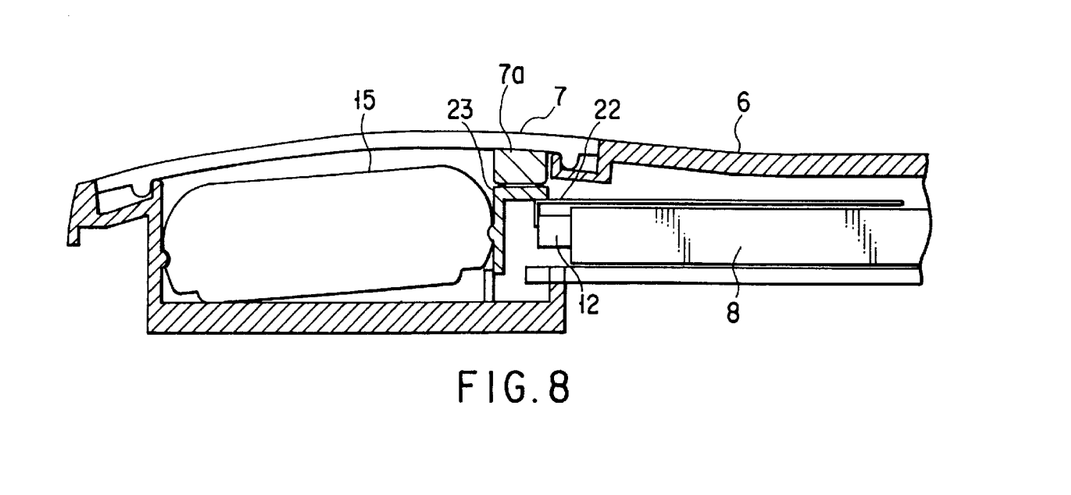
FIG. 8 is a portional view showing the constitution to explain the fixing of the stopper mechanism in the processing apparatus.

Referring to FIG. 8, when the battery compartment cover 7 is attached, a projecting portion 7a formed on the rear surface thereof presses down the connector door 23 to retain the door. Accordingly, the battery compartment cover 7 is attached so that the nail portions 22a can be retained while the nail portions 22a are being pressed downward. Alternatively, a hook similar to that of the connector door 10 according to the foregoing first embodiment is formed. The connector door 23 can be engaged with the hook.

Figure 9:
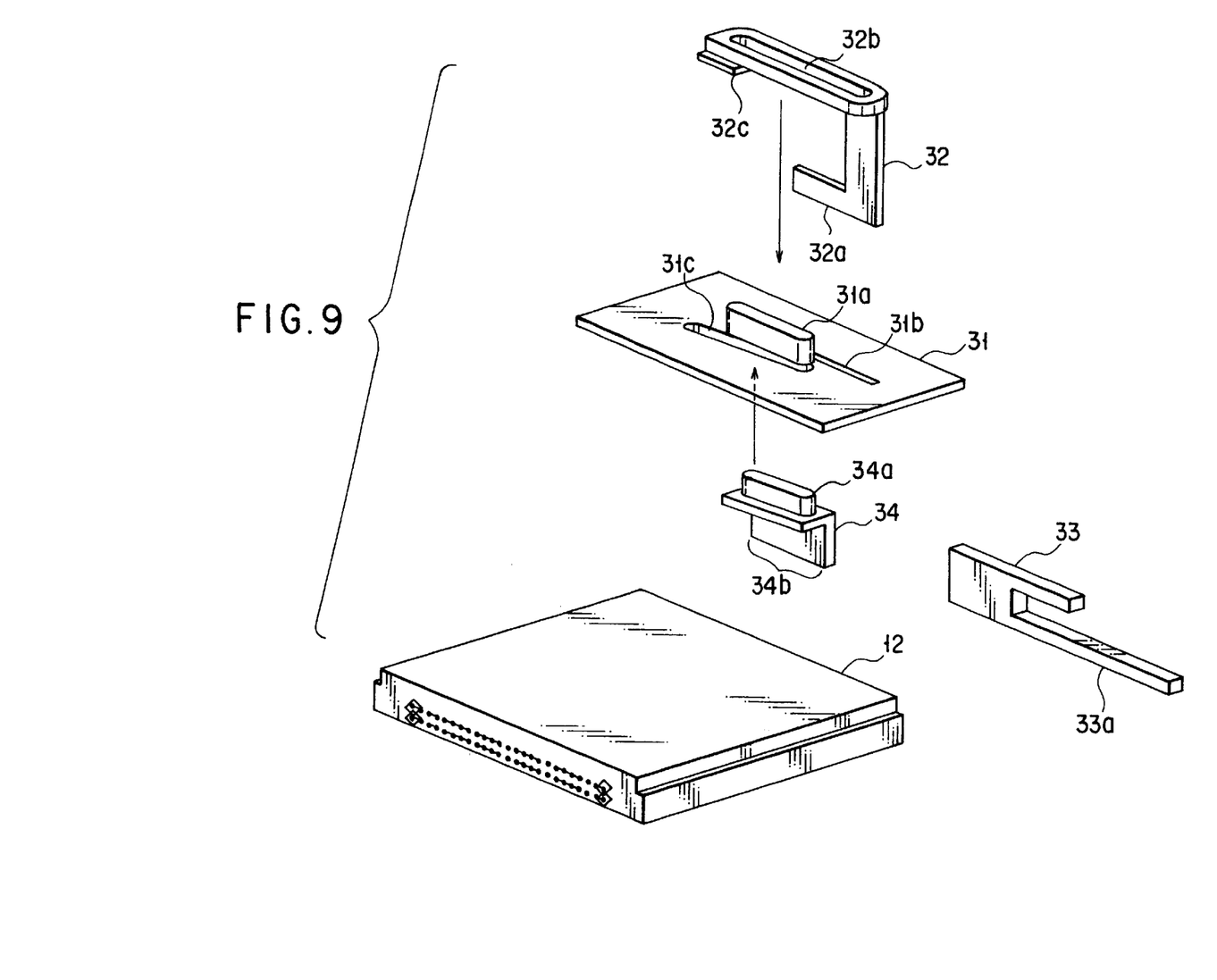
FIG. 9 is a diagram showing an example of a stopper mechanism for preventing connector detachment according to a third embodiment.

FIG. 9 shows and explains a constitutional example of a stopper mechanism for preventing connector detachment according to a third embodiment of the portable information terminal apparatus of the present invention. FIGS. 10A to 10C and FIGS. 11A and 11B are diagrams explaining the principle of detachment prevention by the stopper mechanism. A connector door board 31, a key member 32, a fixing hook 33, and a stopper member 34 are combined to each other to constitute the stopper mechanism. In the connector door board 31, an oval projecting portion 31a is formed at the center of the upper surface of the board. A key hole 31b and a slider hole 31c are opened on both sides of the projecting portion 31a in the longitudinal direction. The holes are formed so that when the stopper mechanism is assembled, the key hole 31b is formed in the direction parallel to the rear surface of the memory card and the slider hole 31c is formed obliquely so as to be close to the rear surface of the memory card. In the key member 32, an L-shaped key portion 32a is formed in the lower portion to be inserted to the key hole 31b, and a ring portion 32b in which a narrow hole is opened is formed in the upper portion to be slidably fitted to the oval projecting portion 31a. At the end of the ring portion 32b, a projected releasing portion 32c for releasing a lock by the stopper member 34 is formed.

The fixing hook 33 includes a lower edge 33a functioning as a guide mechanism and an upper edge 33b that is shorter than the lower edge 33a, so that the hook 33 is U-shaped. The L-shaped key portion 32a is engaged with the U-shaped hook. In the stopper member 34, a slider portion 34a is formed in the upper portion. The slider portion 34a is slidably fitted into the slider hole 31c. The upper portion of the slider portion 34a protruding from the slider hole 31c is engaged with the releasing portion 32c. In the stopper member 34, a wedge-shaped engaging portion 34b is formed in the lower portion. The stopper member 34 is pushed in the pushing (locking) direction by a spring.

Figure 10A:
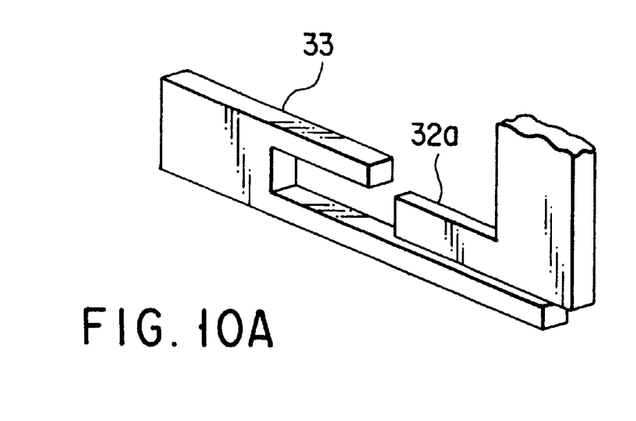
FIGS. 10A, 10B, and 10C are diagrams explaining the operation of the stopper mechanism according to the third embodiment.
Figure 10B:
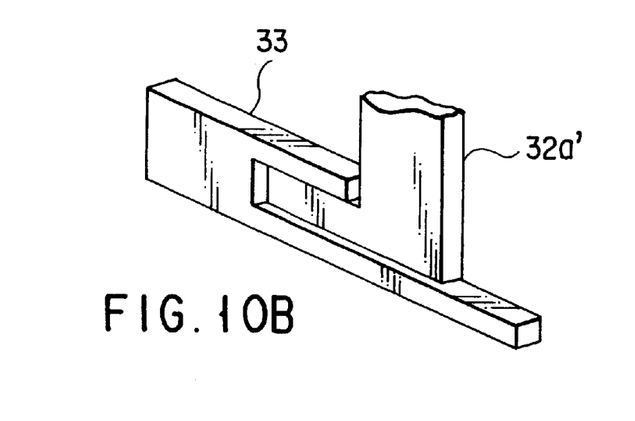
Figure 10C:
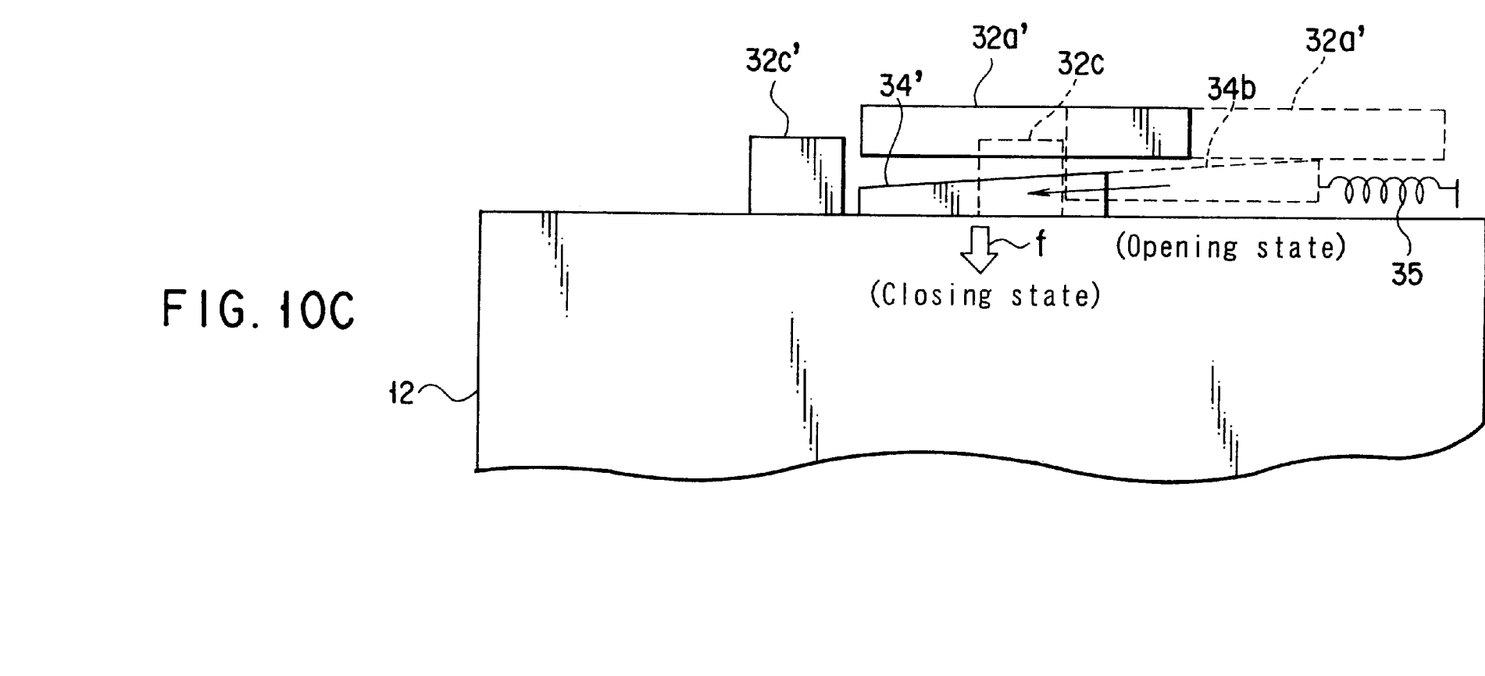
Figure 11A:
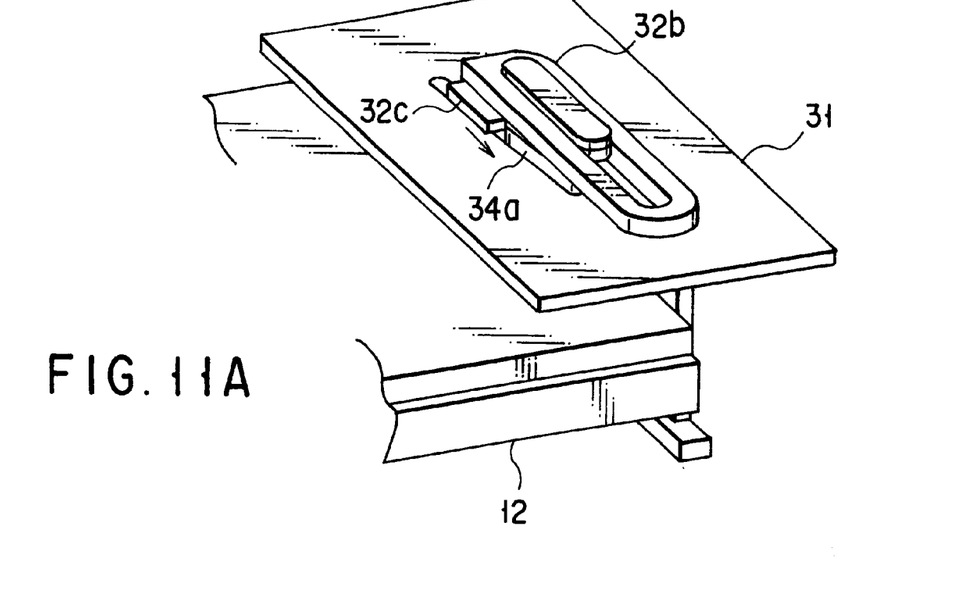
FIGS. 11A and 11B are diagrams showing the stopper mechanism according to the third embodiment observed from the above.
Figure 11B:
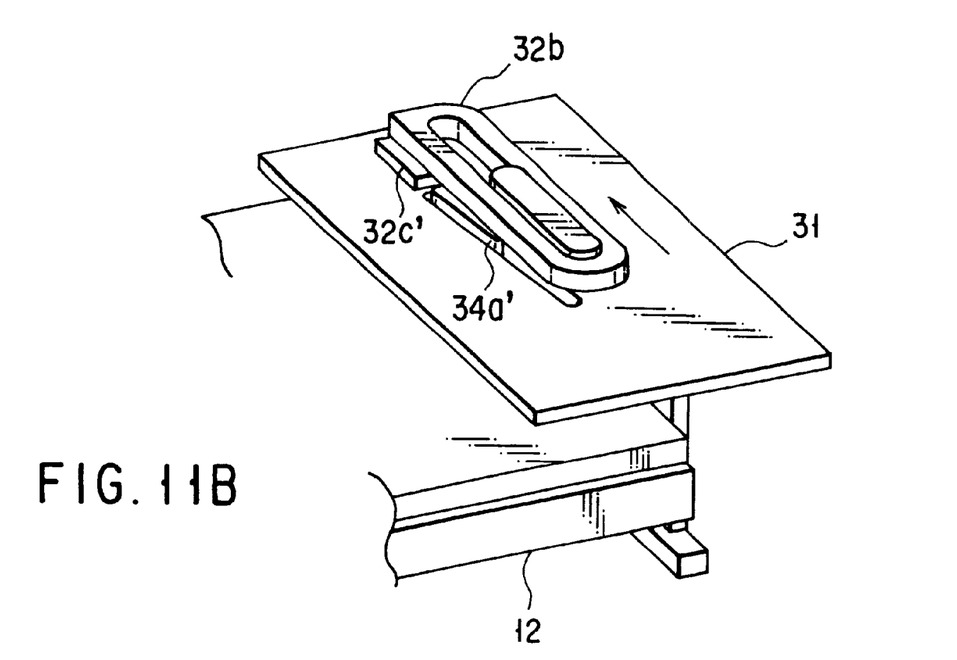

FIGS. 10A and 11A show an "opening state". The L-shaped key portion 32a is disengaged from the fixing hook 33. At that time, the engaging portion 34b of the stopper member 34 is pushed by the releasing portion 32c, so that a gap exists between the engaging portion 34b and the memory card 12 as shown in FIG. 10C. The ring portion 32b is moved in the direction shown in FIG. 11B, resulting in a "closing state" shown in FIGS. 10B and 11B. In this state, the L-shaped key portion 32a' is engaged with the U-shaped portion of the fixing hook 33 and the ring portion 32b' is moved, so that the releasing portion 32c' is moved backward. In accordance with the backward movement, the wedge-shaped stopper member 34b' is moved due to the pressure of a spring 35 to generate a force (f) pressing the rear surface of the memory card 12, resulting in the "closing state".

According to the stopper mechanism of the present embodiment, when the memory card 12 is fixed by sliding, the wedge-shaped engaging portion 34b of the stopper member 34 functions so as to press the rear surface of the memory card 12 toward the connector. Even when an external impact is applied to the apparatus, it is possible to prevent the memory card 12 from being detaching.

FIGS. 12A to 12G are diagrams showing modifications of a stopper mechanism for prevent connector detachment.

Figure 12A:
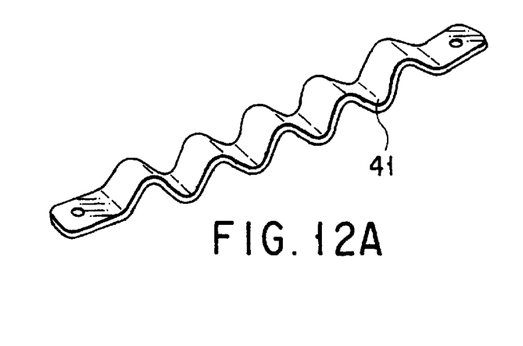
FIGS. 12A to 12G are diagrams showing modifications of a nail portion of the stopper mechanism.
Figure 12B:
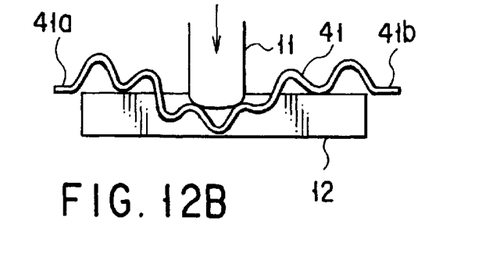

FIGS. 12A and 12B show a modification of the cantilever-shaped plate spring portion 9a shown in FIG. 1A. Both ends 41a and 41b of a spring portion 41 are fixed. The center portion thereof is pressed by the projecting portion 11, so that the spring portion 41 is moved downward on the rear side of the memory card 12 inserted in the slot, whereby the memory card 12 is prevented from being detached.

Figure 12C:
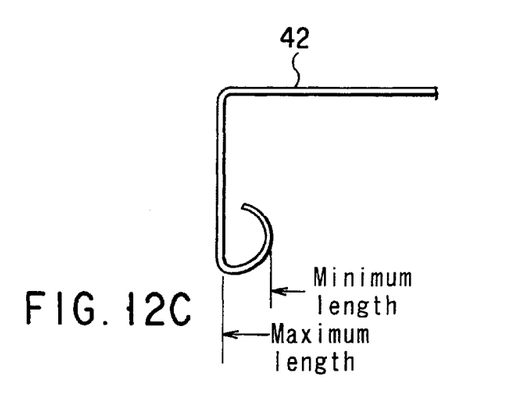
Figure 12D:
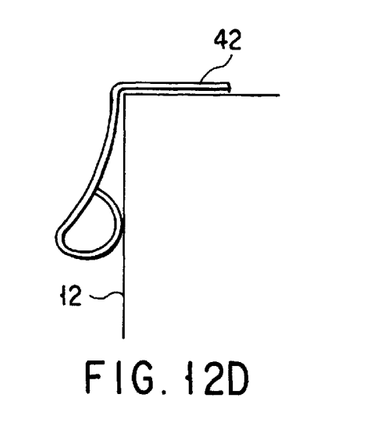

FIGS. 12C to 12G show modifications of the nail portion 22a shown in FIG. 6A. In FIG. 12C, the edge of the nail portion is bent inside. As to the bending width, in consideration of a length error range (the minimum length and the maximum length) in the inserting direction to the connector generated in manufacturing of the memory card, a difference between the minimum length and the maximum length is set to the bending width. Accordingly, when the memory card 12 is retained by a nail portion 42, a bent portion is pushed backward as shown in FIG. 12D.

Figure 12E:
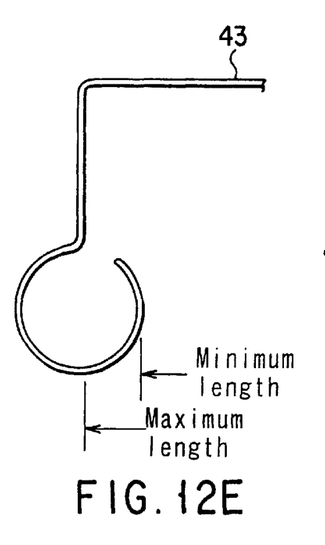
Figure 12F:
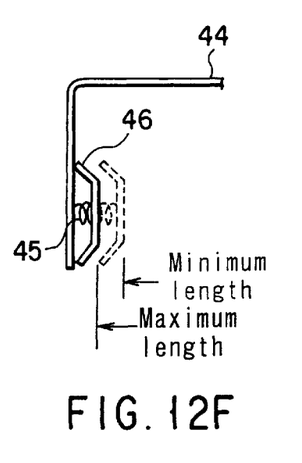
Figure 12G:
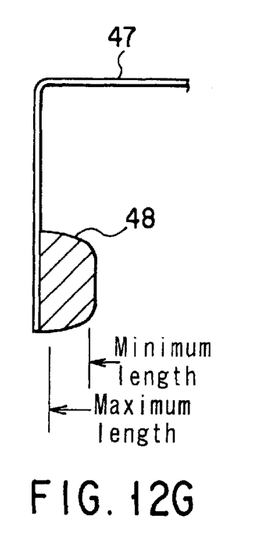

FIG. 12E shows a nail portion 43 in which a bent portion is shaped into a cylinder. In this case as well, a distance to the center portion of the cylinder is set to the maximum length of the memory card and a distance to the periphery of the cylinder is set to the minimum length. FIG. 12F shows a nail portion 44 to which a spring 45 and a stay 46 are attached. In the constitution, the length measured when the spring is most compressed is set to the maximum length of the memory card and the length in a normal spring state is set to the minimum length. Furthermore, FIG. 12G shows a nail portion 47 in which a member 48 made of resin such as Teflon or comprising a hard elastic member is attached on the inside. In this case, the thickness of the member 48 is substantially equivalent to a difference between the minimum length and the maximum length of the memory card.

As mentioned above, the portable information terminal apparatus includes the stopper mechanism for functioning in such a manner that in the case where a memory card is attached as a detachable built-in electronic device which is carried in the portable information terminal apparatus according to the embodiments, connector detachment is prevented on the rear side of the card or, even when the detachment occurs, the detachment is restricted within the detachment allowable range in which electrical connection is not influenced. Consequently, the connector detachment caused by the external impact can be prevented in the portable information terminal apparatus.

In the foregoing embodiments, as a detachable built-in electronic device, CompactFlash has been explained as an example of the memory card. Memory cards such as Smart-Media (registered trademark), SDMemoryCard (trademark), MemoryStick (trademark), and MMC (MultiMediaCard: trademark) which are currently used and each of which comprises a semiconductor memory device can also be used similarly. Not only the semiconductor memory device but also a magnetic recording medium such as a hard disk, a magneto-optical disk medium, an optical recording medium such as a CD-R, and other card-shaped devices, each of which is attached to a connector to be electrically connected thereto and is then operated, can be used similarly.

As described in detail, according to the present invention, there can be provided the portable information terminal apparatus in which the stopper mechanism with a simple constitution is provided to be able to prevent an attached built-in electronic device, the device being detachable, from being detached over the allowable range even when an external impact is applied.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A portable information terminal apparatus comprising:
 an information input portion;
 a circuit board having a CPU for processing inputted information;
 a display portion for displaying information;
 a detachable card-shaped electronic device;
 an internal battery for supplying electric power;
 a battery receiving portion for receiving the internal battery;
 a detachable battery cover for covering the battery receiving portion;
 a connector including a connecting terminal for transmitting or receiving a signal to/from the card-shaped electronic device, in which the card-shaped electronic device is inserted to be held; and
 a stopper mechanism for preventing the card-shaped electronic device from being detached from the connector;
 wherein the stopper mechanism comprises a restricting member for restricting movement of the card-shaped electronic device in a detaching direction, and the restricting member comprises:
  an elastic member changeable between a first state in which the card-shaped electronic device can be attached or detached to/from the connector and a second state in which the card-shaped electronic device is restricted from being detached from the connector; and
  a holding member for holding the elastic member in the second state; and
 wherein the battery receiving portion includes:
  an opening through which the card-shaped electronic device is attached or detached to/from the connector arranged in a main body of the apparatus; and
  a connector door member for covering the opening for the connector, and the connector door member has a projecting portion for pressing the elastic member to hold the member in the second state.

2. The apparatus according to claim 1, wherein the detachable card-shaped electronic device is a card-shaped storage medium (memory card) having any one of recording means such as a semiconductor memory device, a CD-R, a DVD-RAM, an MO (magneto-optical disk), and a hard disk.

3. A portable information terminal apparatus comprising:
 an information input portion;
 a circuit board having a CPU for processing inputted information;
 a display portion for displaying information;
 a detachable card-shaped electronic device;
 an internal battery for supplying electric power;
 a battery receiving portion for receiving the internal battery;
 a detachable battery cover for covering the battery receiving portion;
 a connector including a connecting terminal for transmitting or receiving a signal to/from the card-shaped electronic device, in which the card-shaped electronic device is inserted to be held; and
 a stopper mechanism for preventing the card-shaped electronic device from being detached from the connector;
 wherein the battery receiving portion comprises:
  an opening through which the card-shaped electronic device is attached or detached to/from the connector arranged in a main body of the apparatus; and a connector door member for covering the opening for the connector, in which the stopper mechanism is arranged.

4. The apparatus according to claim 3, wherein the stopper mechanism, which is arranged in the connector door member, comprises a connector door board, a key member, a fixing hook portion, and a wedge-shaped stopper member, and wherein when the key member is slid, the wedge-shaped stopper member comes into contact with the card-shaped electronic device so as to push the card-shaped electronic device to the connecting terminal, and the key member is then engaged with the fixing hook portion, thereby preventing the card-shaped electronic device from being detached from the connector.

5. The apparatus according to claim 3, wherein the detachable card-shaped electronic device is a card-shaped storage medium (memory card) having any one of recording means such as a semiconductor memory device, a CD-R, a DVD-RAM, an MO (magneto-optical disk), and a hard disk.

6. The apparatus according to claim 4, wherein the detachable card-shaped electronic device is a card-shaped storage medium (memory card) having any one of recording means such as a semiconductor memory device, a CD-R, a DVD-RAM, an MO (magneto-optical disk), and a hard disk.

7. A portable information terminal apparatus comprising:
an information input portion;
a circuit board having a CPU for processing inputted information;
a display portion for displaying information;
a detachable card-shaped electronic device;
an internal battery for supplying an electric power driving at least one component; battery; and
a detachable battery cover for covering the battery receiving portion,
wherein the battery receiving portion includes:
 an opening through which the card-shaped electronic device is attached or detached to/from a connector disposed in a main body of the apparatus; and
 a connector door member for covering the opening for the connector, and
only when the battery cover and the connector door member are detached, the card-shaped electronic device can be detached.

8. The apparatus according to claim 7, wherein the detachable card-shaped electronic device is a card-shaped storage medium (memory card) having any one of recording means such as a semiconductor memory device, a CD-R, a DVD-RAM, an MO (magneto-optical disk), and a hard disk.

* * * * *